(12) United States Patent
Kuhn

(10) Patent No.: US 8,391,135 B1
(45) Date of Patent: Mar. 5, 2013

(54) METHOD AND APPARATUS FOR CHANNEL INTERFERENCE MITIGATION FOR WIRELESS COMMUNICATIONS

(75) Inventor: Steven J. Kuhn, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 12/756,723

(22) Filed: Apr. 8, 2010

(51) Int. Cl.
*H04J 1/00* (2006.01)
(52) U.S. Cl. ......... 370/227; 370/230; 370/252; 370/401
(58) Field of Classification Search .......... 370/216–228, 370/252, 253, 400, 401, 468
See application file for complete search history.

(56) References Cited

U.S. PATENT DOCUMENTS

| | | | | |
|---|---|---|---|---|
| 2006/0291401 | A1* | 12/2006 | Yuen et al. | 370/252 |
| 2010/0027517 | A1* | 2/2010 | Bonta et al. | 370/338 |
| 2010/0091715 | A1* | 4/2010 | Akchurin et al. | 370/329 |

* cited by examiner

*Primary Examiner* — Pao Sinkantarakorn
(74) *Attorney, Agent, or Firm* — Bever, Hoffman & Harms, LLP

(57) ABSTRACT

An access point and an integrated circuit including processor are disclosed operating the transceiver to create a station link table for a link to the station, a channel quality estimate of the home channel, an other channel quality sample log for at least one other channel and an other channel quality estimate based upon the other channel sample log. The processor using the station link table and the channel quality estimate of the home channel to determine if the access point has difficulty meeting the minimum required bandwidth and responds to difficulty by determining if the other channel can meet the minimum required bandwidth and schedule changing the home channel to the other channel.

25 Claims, 7 Drawing Sheets

Fig. 3A
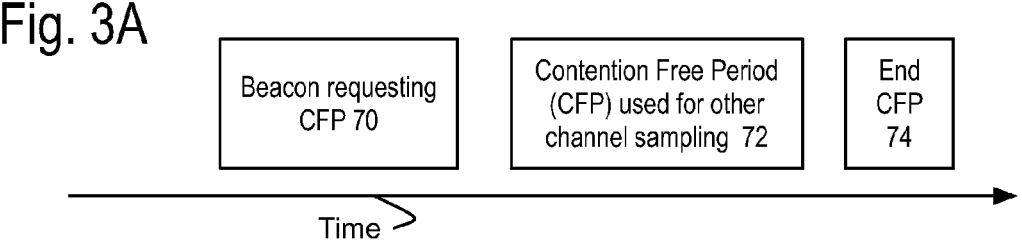
Fig. 3B
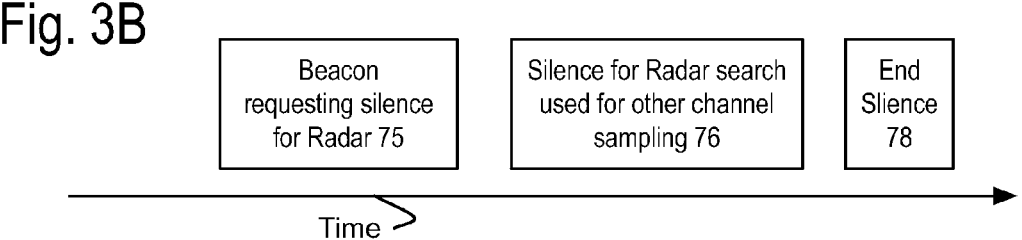
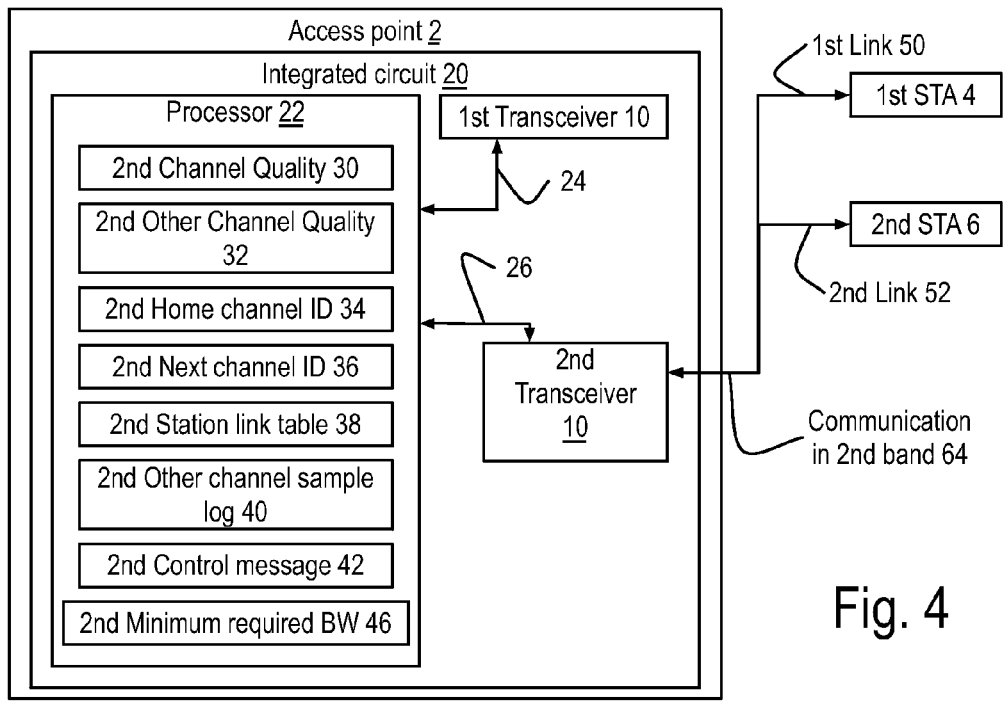
Fig. 4

METHOD AND APPARATUS FOR CHANNEL INTERFERENCE MITIGATION FOR WIRELESS COMMUNICATIONS

TECHNICAL FIELD

This invention relates to access point mitigating channel interface in a wireless communications network.

BACKGROUND OF THE INVENTION

Most wireless communications is based upon allowing an operational band of the electromagnetic spectrum into at least two physical channels. Typically, an access point or command center for the wireless network will operate a radio transceiver in that band at one of the physical channels. In some applications the access point may operate two radio transceivers, each transceiver operating in one of the physical channels of the transceiver's operational band. By way of example, some contemporary access points operate one transceiver at a 2.4 GHz band and a second transceiver at a 5 GHz band, with the transceivers communicating on separate, often unrelated channels within their respective bands.

Channel interference is the damage caused by background signals in a physical channel that interfere with the communications between an access point and its stations, which is a problem for all wireless communication schemes. Particularly with the IEEE 802.11 communications standards and the evolution of other wireless communications standards such as Bluetooth, the channel interference can change over time. While these communications standards include provisions for selecting a physical channel when an access point starts up, as the channel interference and bandwidth requirements for the access point change, what was initially a good choice for the operating channel may turn out to no longer be adequate. Methods and apparatus are needed to recalculate the channel capacities, and if needed, change the channel to improve network performance.

SUMMARY OF THE INVENTION

Embodiments include an access point and an integrated circuit with a processor using a transceiver to wirelessly communicate in a home channel of a band with at least one station at a minimum required bandwidth. The processor operates the transceiver to create a station link table for the link of each station, a channel quality estimate of the home channel, an other channel sample log and an other channel quality estimate of the other channel based upon the other channel sample log. The processor uses the station link table and the channel quality estimate of the home channel to determine if the home channel has difficulty maintaining its minimum required bandwidth. The processor responds to the home channel having difficulty by determining if the other channel quality can meet the minimum required bandwidth given the station link table then scheduling the home channel to switch to the other channel.

The band includes at least one other channel besides the home channel. The band may have a frequency about which the channels are arranged. That frequency may be approximately a first frequency of 2.4 Giga Hertz (GHz) or a second frequency of 5 GHz. The transceiver may support some form of a wireless communications protocol such as a version of IEEE 802.11.

The processor may create the other channel quality sample differently depending upon the frequency of the band. If the band uses the first frequency, the processor may send a beacon message ordering a contention free period in which all stations that receive that message stop transmitting in the band. When the other channel quality sample has been created, the processor signals that the contention free period is at an end. If the band uses the second frequency, the processor may send a beacon silencing the stations to look for radar signals according to the IEEE protocol. The processor proceeds to create the other channel quality sample during this silence.

The access point may further include the processor using a second transceiver to wirelessly communicate in a second home channel of a second band with the at least one station at a second minimum required bandwidth. The processor may operate the second transceiver in a similar manner as described above.

The processor may include at least one instance of a computer accessibly coupled to a computer readable memory and instructed by a program system including program steps residing in the memory to implement the process and/or a finite state machine and/or an inferential engine. The program system may be created and/or altered by an installation package that may be received from a server and/or a removable memory device. The server and/or the removable memory device may include the program system and/or the installation package.

The processor may further receive a request for access by a new station in the home channel, determine that the access will not be able to meet the minimum required bandwidth on the home channel and execute the preceding steps to determine if an other channel can support that bandwidth and subsequently switch the home channel to the other channel before accepting access by the station. Alternatively, if there is no other channel that can support the new minimum required bandwidth, access by the station may be denied.

BRIEF DESCRIPTION OF THE DRAWINGS

FIG. 3A shows the network traffic between the access point and the stations while the processor creates the other channel quality sample when the band of FIG. 1 uses the first band of FIG. 2A.

FIG. 3B shows the network traffic between the access point and the stations while the processor creates the other channel quality sample when the band of FIG. 1 uses the second band of FIG. 2B.

FIG. 4 shows the access point of FIG. 1 further including the processor using a second transceiver to communicate in the second band with the stations and operating in a similar manner.

DETAILED DESCRIPTION

This invention relates to access point mitigating channel interface in a wireless communications network. Embodiments include an access point with a processor using a transceiver to wirelessly communicate in a home channel of a band with at least one station at a minimum required bandwidth. The processor operates the transceiver to create a station link table for the link of each station, a channel quality estimate of the home channel, an other channel sample log and an other channel quality estimate of the other channel based upon the other channel sample log. The processor uses the station link table, the channel quality estimate of the home channel and the other channel quality estimate to determine if the home channel has difficulty maintaining its minimum required bandwidth. The processor responds to the home channel having difficulty by determining if the other channel quality can meet the minimum required bandwidth given the station link table then scheduling the home channel to switch to the other channel.

Figure 1:
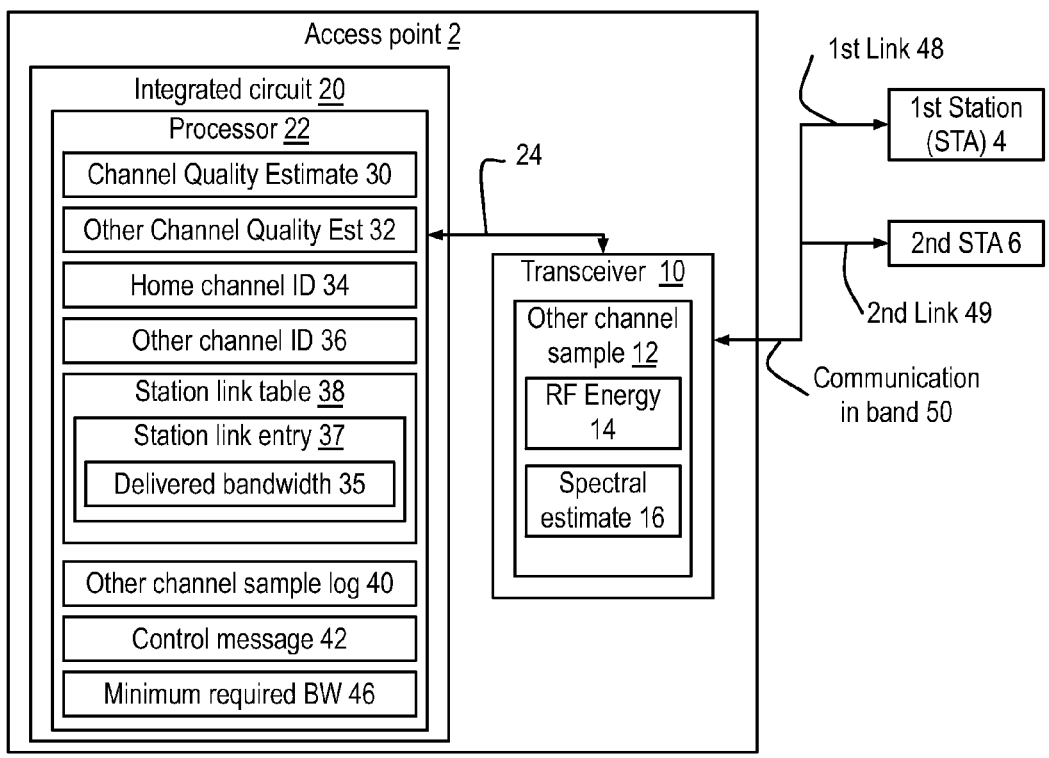
FIG. 1 shows a block diagram of an example access point including a processor controlling a transceiver to wirelessly communicate in a home channel of a band with at least one, and as shown here, two stations, each with their own link to the access point at a minimum required bandwidth.

To introduce the embodiments, the discussion has started by considering an access point 2 operating a single transceiver 10 on a home channel 34 of a single band 50 as shown in FIG. 1. Later, embodiments of the access point using two transceivers will be discussed as shown in FIG. 4, but first the overall operations of using one transceiver will be developed, with a summary of how the access point acts being shown in FIGS. 3A and 3B and further developed in the flowcharts of FIGS. 6 to 14.

Also, to introduce the elements and operational steps of the method embodiments, the discussion will focus on the home channel 34 and one other channel 36, but it should be remembered that most wireless communications protocols support more than two channels and that embodiments including operations for more than one other channel are encompassed in this disclosure and its claims. The transceivers, channels and bands may be compatible with versions of the Institute for Electrical and Electronic Engineers (IEEE) wireless communications standards such as 802.11.

Referring to the drawings more particularly by reference numbers, FIG. 1 shows a block diagram of an example embodiment of an access point 2 including a processor 22 controlling a transceiver 10 to wirelessly communicate in a home channel of a band 50 with at least one, and as shown here, two stations 4 and 6, each with their own link to collectively communicate with the access point at a minimum required bandwidth 46. A home channel identifier 34 specifies the home channel. The first station 4 has the first link 48 and the second station 6 has the second link 49. The processor 22 operates the transceiver 10 to create a station link table 38 for the link of each station, a channel quality estimate 30 of the home channel, an other channel sample 12 to be integrated and/or included in an other channel sample log 40 and an other channel quality estimate 32 of the other channel based upon the other channel sample log 40. The processor uses the station link table 38, the channel quality estimate 30 of the home channel 34 and the other channel quality estimate 32 to determine if the home channel has difficulty meeting its minimum required bandwidth 46. For example, the minimum required bandwidth 46 may be based upon a bandwidth required to sustain a communication transaction. For example, if video is being transmitted from a Station to an Access Point, it may be determined that such a transaction requires a specific amount of bandwidth. This specific amount of bandwidth may be, in part, the minimum required bandwidth 46. The processor responds to the home channel having difficulty by determining if the other channel can meet the minimum required bandwidth given the station link table and then schedules the home channel to switch to the other channel.

The other channel sample 12 may include, but is not limited to, a Radio Frequency (RF) energy estimate 14 of the other channel and/or a spectral estimate 16 of the other channel.

The station link table 38 may include a station link entry 37 for a link 48 to a station 4, and may further include a station link entry for each link to a station wirelessly communicating with the access point 2 in the band 50. The station link entry 37 may include an estimate of the delivered bandwidth 35 to the station.

In certain embodiments, an integrated circuit 20 may include the processor 22 and possibly the transceiver 10. As used herein, a transceiver includes a receiver and a transmitter.

Figure 2A:
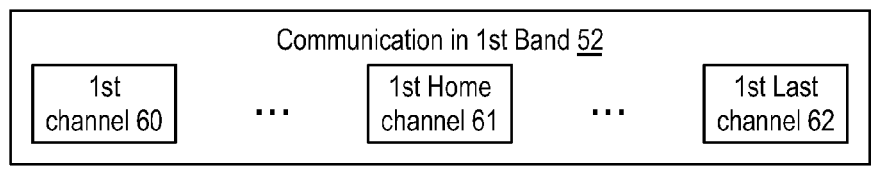
FIG. 2A shows that the band of FIG. 1 may be a first band at a first frequency that may be approximately 2.4 GHz about which the channels of the band may be arranged.
Figure 2B:
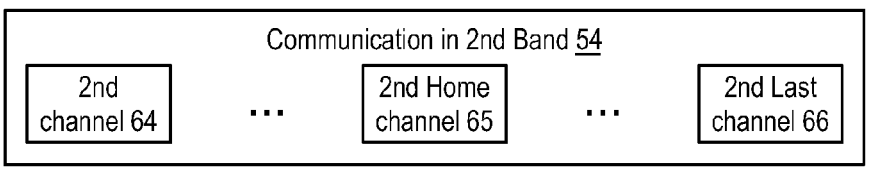
FIG. 2B shows a second band at a second frequency that may be approximately 5 GHz about which the channels of the band may be arranged.

The band 50 includes at least one other channel besides the home channel. The band may have a frequency about which the channels are arranged. FIG. 2A shows that the band 50 of FIG. 1 may be a first band 52 at a first frequency 63 that may be approximately 2.4 GHz about which the channels 60, 61 and 62 of the band may be arranged. By way of example, the access point may communicate in the first band 52 by use of a first home channel 61. FIG. 2B shows a second band 54 at a second frequency 67 that may be approximately 5 GHz about which the channels 64, 65 and 66 of the band may be arranged. Again as an example, the access point may communicate in the second band 54 by use of a second home channel 65.

The processor 22 may create the other channel quality sample 12 differently depending upon the frequency of the band. If the band uses the first frequency 63 of FIG. 2A, the processor may send a beacon message ordering a contention free period in which all stations 4 and 6 that receive that message stop transmitting in the band, which will be discussed with regards FIG. 3A. When the other channel quality sample has been created, the processor signals that the contention free period is at an end. If the band uses the second frequency 65 of FIG. 2B, the processor 22 may send a beacon silencing the stations to look for radar signals, which will be discussed with regards FIG. 3B. The processor then proceeds to create the other channel quality sample during this silence.

FIG. 3A shows a diagram through time of the network traffic between the access point 2 and the stations 4 and 6 while the processor 22 creates the other channel quality sample 12 when the band 50 of FIG. 1 uses the first band 52 of FIG. 2A. The access point 2 sends a beacon 70 requesting a Contention Free Period (CFP) of all stations 4 and 6 that receive the beacon. These stations respond by terminating all radio frequency transmissions in the first band 52 creating the Contention Free Period (CFP) 72 during which the access point 2 uses the transceiver 10 to create the other channel quality sample 12 that the processor 22 integrates and/or includes into the other channel sample log 40. After the quality sample 12 has been received of the transceiver 10, the processor 22 directs the transceiver to send a second message 74 ending the contention free period 72. Once the stations 4 and 6 have received this second message 74, they respond by resuming their radio traffic in the first band.

FIG. 3B shows a diagram through time of the network traffic between the access point 2 and the stations 4 and 6 while the processor 22 creates the other channel quality sample 12 when the band 50 of FIG. 1 uses the second band 54 of FIG. 2B. The access point 2 sends a beacon 75 requesting silence from all stations 4 and 6 communicating with the access point on this home channel 65. These stations respond by terminating all radio frequency transmissions in the second home channel 65 creating the silence 76 during which the access point 2 uses the transceiver 10 to create the other channel quality sample 12 that the processor 22 integrates and/or includes into the other channel sample log 40. After the quality sample 12 has been received from the transceiver 10, the processor 22 directs the transceiver to send a second message 78 ending the silence 76. Once the stations 4 and 6 have received this second message 74, they respond by resuming their radio traffic in the second band.

The access point 2 may further include a second transceiver 10 used by the processor 22 to wirelessly communication in a second home channel of a second band with the stations at a second minimum required bandwidth 46. The processor may operate the second transceiver in a similar manner as described above.

FIG. 4 shows the access point 2 of FIG. 1 further including the processor 22 using a second transceiver 10 to communicate 64 in a second band, such as the second band 54 of FIG. 2B with the stations 4 and 6 and operating in a similar manner. In some embodiments, the first transmitter may operate in the first band 52 of FIG. 2A. The links of stations and their respective bandwidth capacities may vary between the two bands due to the differing frequencies of operation among other factors. The processor may keep separate parameters and make separate decisions about these two bands, with potentially differing home channels 61 and 65, as well as making independent determinations of the difficulty of the access point's ability to deliver the minimum required bandwidth in these home channels. In some embodiments, the access point 2 of FIG. 1 may be configured to operate in the previously described manner, especially if the transceiver 10 may be tuned to the first and second bands 52 and 54.

Figure 5:
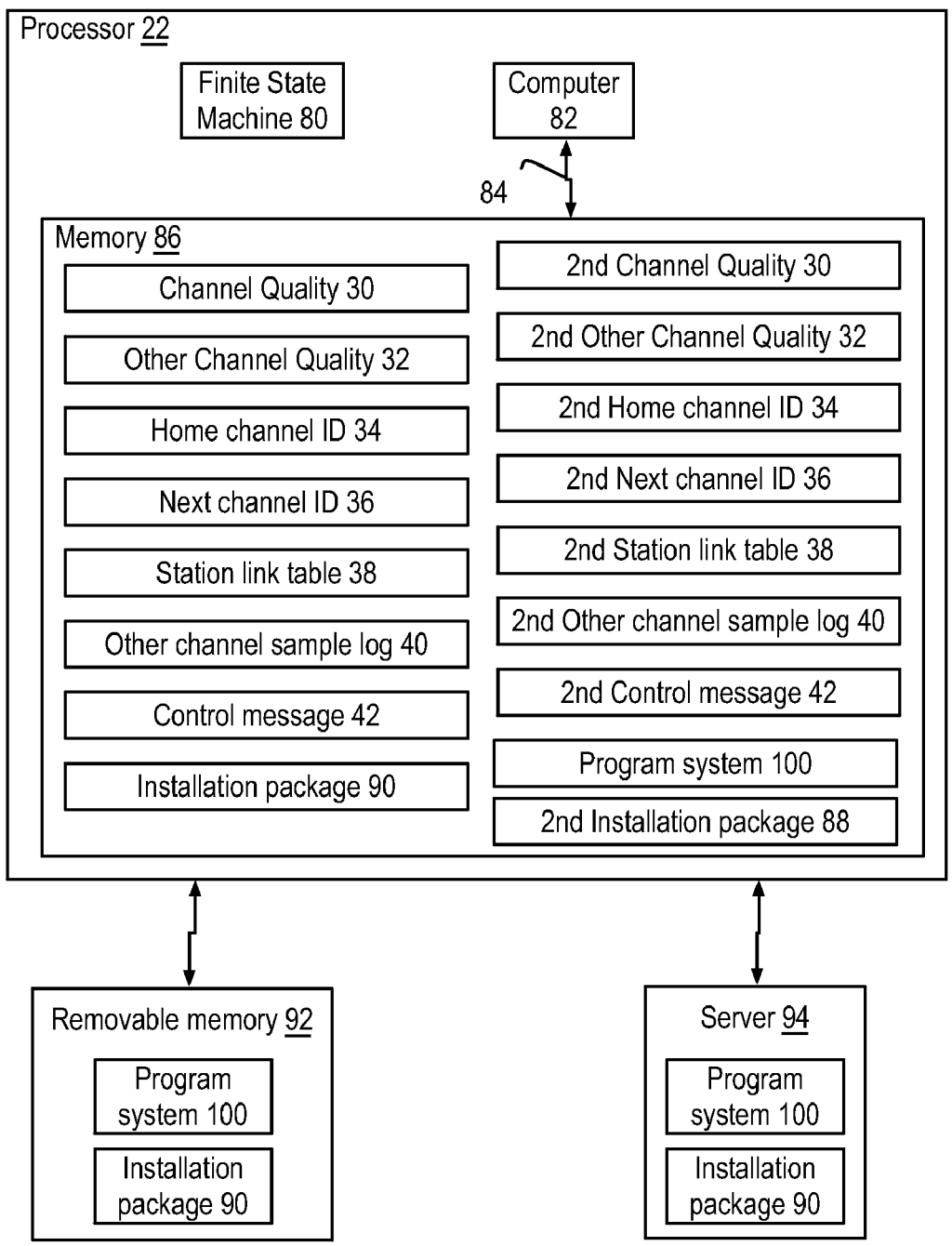
FIG. 5 shows the processor may include at least one instance of a finite state machine and/or at least one instance of a computer accessibly coupled to a computer readable memory and instructed by a program system that may be altered and/or created through the use of an installation package may be received from a removable memory device and/or a server.

FIG. 5 shows the processor 22 may include at least one instance of a finite state machine 80 and/or at least one instance of a computer 82 accessibly coupled 84 to a computer readable memory 86 and instructed by a program system 100 to operate the access point 2. The program system 100 may be altered to operate through the use of an installation package 90. The program system 100 and/or the installation package 90 may be received by the processor 22 from a removable memory device 92 and/or a server 94. Alternatively, the computer may execute the installation package to configure the finite state machine 80. The server 94 and/or the removable memory device 92 may include the program system 100 and/or the installation package 90. The memory 86 and/or the removable memory 92 may include a nonvolatile memory component for storing the program system and/or the installation package.

As used herein, any computer 82 includes at least one data processor and at least one instruction processor instructed by a program system 100, where each of the data processors is instructed by at least one of the instruction processors.

As used herein, a finite state machine 80 receives at least one input, maintains and updates at least one state and generates at least one output based upon the value of at least one of the inputs and/or the value of at least one of the states.

FIGS. 6 to 13 show flowcharts of various details of the program system 100 implementing various operational embodiments of the access point. These flowcharts show some method embodiments, which may include arrows signifying a flow of control, and sometimes data, supporting various implementations. These may include a program operation, or program thread, executing upon the computer 82 or states of a finite state machine 80. Each of these program steps may at least partly support the operation to be performed. Other circuitry such as radio components, specialized encoders and/or decoders, memory management and so on may also be involved in performing the operation. The operation of starting a flowchart refers to entering a subroutine or a macro instruction sequence in the computer or of a possibly initial state or condition of the finite state machine. The operation of termination in a flowchart refers to completion of those operations, which may result in a subroutine return in the computer or possibly return the finite state machine to a previous condition or state. The operation of terminating a flowchart is denoted by a rounded box with the word "Exit" in it.

Figure 6:
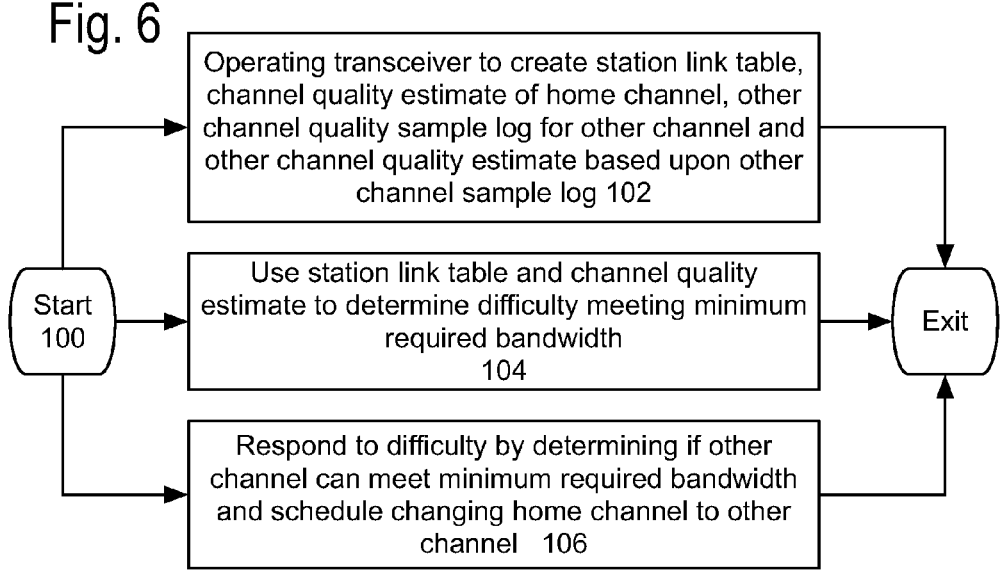
FIGS. 6 to 14 show flowcharts of details of the program system implementing various operational embodiments of the access point.

FIG. 6 shows a flowchart of the program system 100 implementing the operations of the access point 2 for a band with a home channel and at least one other channel including the following: Program step 102 supports the processor 22 operating the transceiver 10 to create the station link table 38, the channel quality estimate 30 of the home channel 34, the other channel quality sample log 40 for the other channel 36, and its other channel quality estimate 32 based upon the other channel sample log. Program step 104 supports using the station link table 38 and the channel quality estimate 30 to determine if the access point 2 has difficulty meeting the minimum required bandwidth 46. And program step 106 supports responding to the difficulty by determining if the other channel 36 can meet the minimum required bandwidth 46 and scheduling a change of the home channel 34 to the other channel 36.

Figure 7:
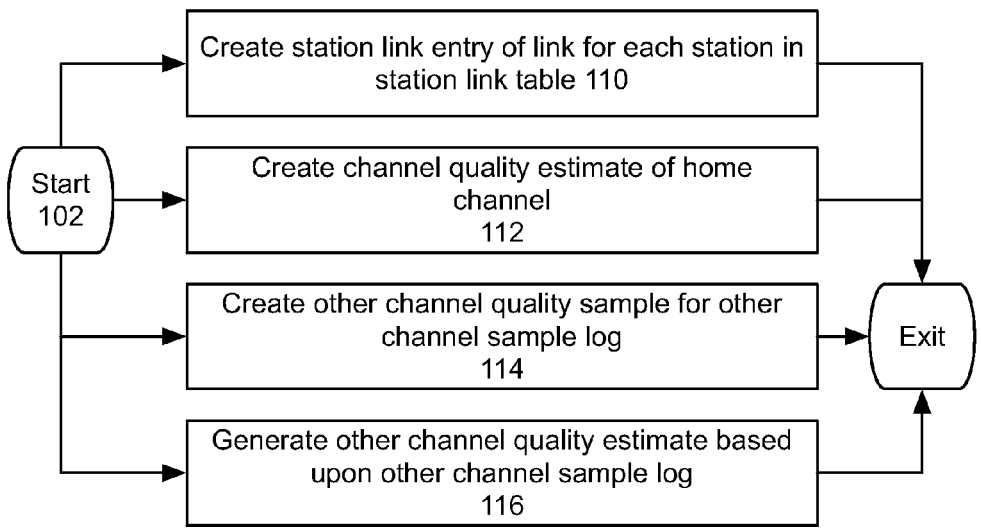

FIG. 7 shows some details of the program step 102 operating the transceiver 10. Program step 110 supports creating a station link entry for each station 4 and 6 in the station link table 38. Program step 112 supports creating the channel quality estimate 30 for the home channel 34. Program step 114 supports creating the other channel quality sample 12 for the other channel sample log 40. Program step 116 supports generating the other channel quality estimate 32 based upon the other channel sample log 40.

Figure 8:
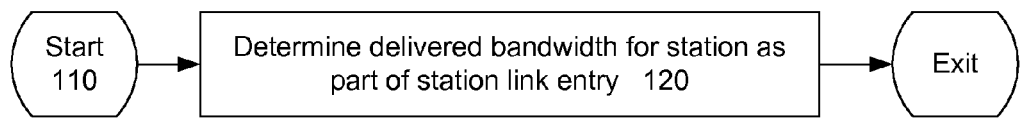

FIG. 8 shows a flowchart of some details of the program step 110 creating a station link entry for each station 4 and 6 in the station link table 38 by including the following: Program step 120 supports determining the delivered bandwidth 35 for a station 4 as part of the station link entry 37. In one embodiment, the delivered bandwidth 35 may be based upon a determined bandwidth required to sustain a current communication transaction. For example, if video is being transmitted from an Access Point to a Station, it may be determined that such a transaction requires an amount of bandwidth.

Figure 9:
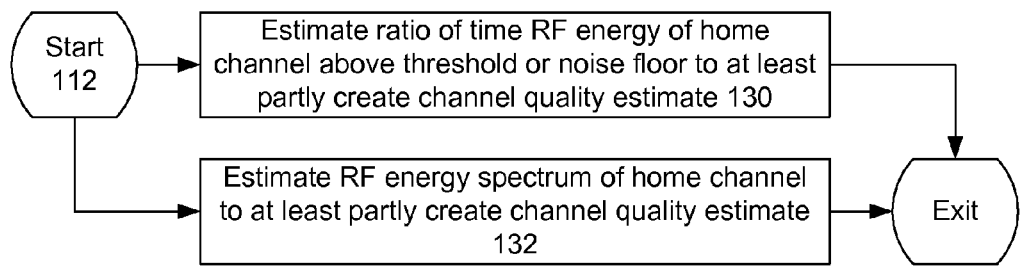

FIG. 9 shows a flowchart of some details of the program step 112 creating the channel quality estimate 30 for the home channel 34 by including at least one of the following: Program step 130 supports estimating the ratio of time the Radio Frequency (RF) energy 14 of the home channel 34 is above a threshold or the noise floor to at least partly create the channel quality estimate 30. In one embodiment, RF energy 14 may be sampled periodically (e.g., every 10 ms). The RF energy sample may be compared to the threshold. A predetermined number of such associated values may be examined to determine the ratio or percentage of time that the RF energy does not exceed the threshold. This value can be used in part to create a channel quality estimate. For example, if one hundred (100) of the most recent RF energy samples are reviewed and ten (10) of those are greater than the threshold, then the quality estimate 30 may be 90%. In one embodiment, the quality estimate 30 may be determined, in part, by reviewing a predetermined number of the most recent RF energy samples. These RF energy samples may be used to comprise the other sample log 40 shown in FIG. 5. The ratio may be expressed as a fraction, such as in percentage points or as a fixed point number with an assumed binary "decimal" point or as a floating point number. Program step 132 also supports estimating the RF energy spectrum 16 of the band to at least partly create the channel quality estimate, by having the software program instructions examine the amplitude of the RF energy for a number of frequencies spaced around the home frequency 34 in the band, e.g. in 5 MHz increments, and determining which of those frequencies, including the home frequency have an amplitude of RF energy greater than a threshold when averaged over a period of time, e.g. 500 milliseconds. Note that these same program steps may be used for the other channel 36 to at least partly create its other channel samples 12.

Figure 10:
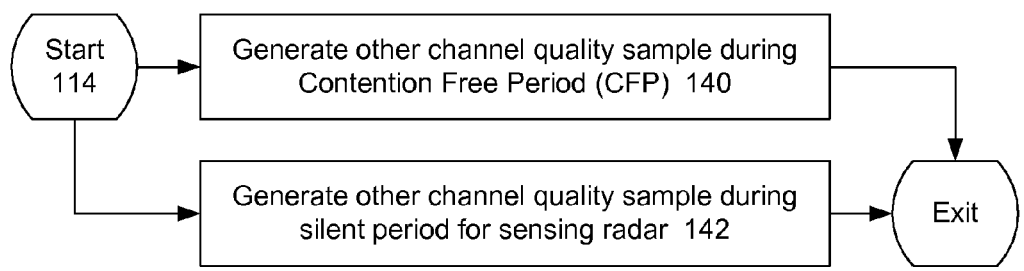

FIG. 10 shows a flowchart of some details of program step 114 creating the other channel quality sample 12 for the other channel sample log 40 by including one of the following based in part upon the frequency of the band 50. Program step 140 supports generating the other channel quality sample 12 during a contention free period 72 for a home channel 61 in the first band 52 with its first frequency 63 of 2.4 GHz. Program step 142 supports generating the other channel quality sample during the silent time 76 typically used for sensing radar for the home channel 65 in the second band 54 with its second frequency of about 5 GHz.

Figure 11:
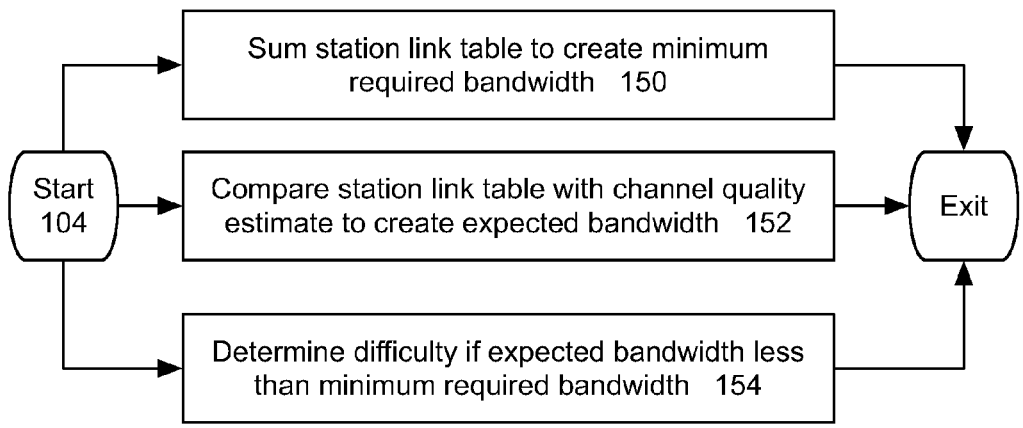

FIG. 11 shows a simplified flowchart of program step 104 using the station link table 38 and the channel quality estimate 30 to determine if the access point 2 has difficulty meeting the minimum required bandwidth 46. Program step 150 supports summing the station link table 38 to create the minimum required bandwidth 46. Program step 152 supports comparing the station link table 38 with the channel quality estimate 30 to create the expected bandwidth. Program step 154 supports determining the access point 2 has difficulty if the expected bandwidth is less than the minimum required bandwidth 46.

Figure 12:
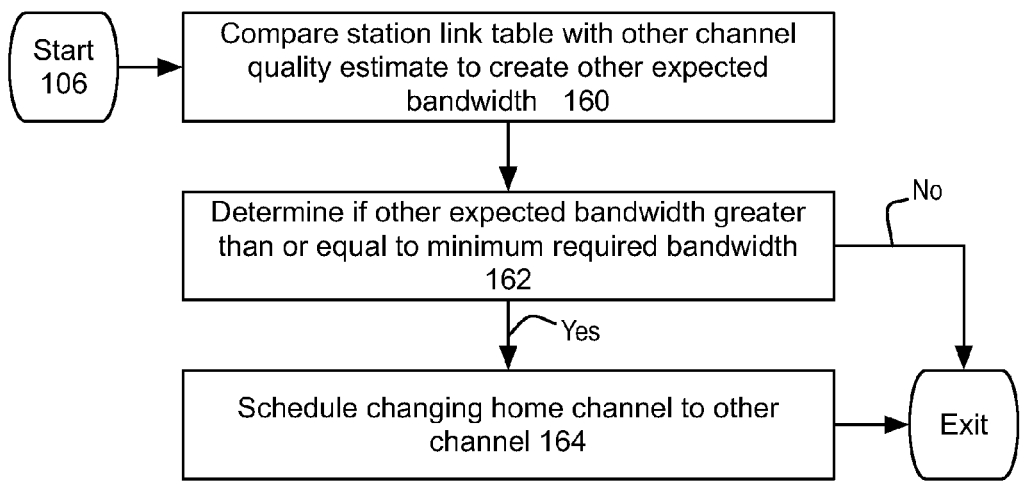

FIG. 12 shows a simplified flowchart of program step 106 responding to the difficulty by determining if the other channel 36 can meet the minimum required bandwidth 46 and scheduling a change of the home channel 34 to the other channel 36. Program step 160 supports comparing the station link table 38 with the other channel quality estimate 32 to create the other channel expected bandwidth. Program step 162 supports determining if the other channel expected bandwidth is greater than or equal to the minimum required bandwidth 46. If not, then exiting, else program step 160 supports scheduling a change of the home channel 34 with the other channel 36. Note that in embodiments comparing multiple other channels, a first determination of which other channels can meet the minimum required bandwidth may be followed by a second determination of which other channel may best meet the minimum required bandwidth. Alternatively, the second determination may be some form of a greedy algorithm selecting the nearest channel, or the first channel to meet the minimum required bandwidth.

The processor 22 may further receive a request for access by a new station 6 in the home channel 34, determine that the access will not be able to meet the minimum required bandwidth 46 on the home channel and execute the preceding steps to determine if an other channel 36 can support that bandwidth and subsequently switch the home channel 34 to the other channel 36 before accepting access by the station. Alternatively, if there is no other channel that can support the new minimum required bandwidth, access by the station may be denied.

Figure 13:
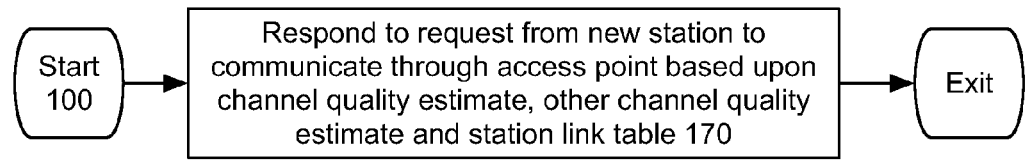

FIG. 13 shows a flowchart extending the program system 100 to include program step 170 that supports responding to a request by a new station 6 to join the wireless network serviced by the access point 2 based upon the channel quality estimate 30, the other channel quality estimate 32 and the station link table 38.

Figure 14:
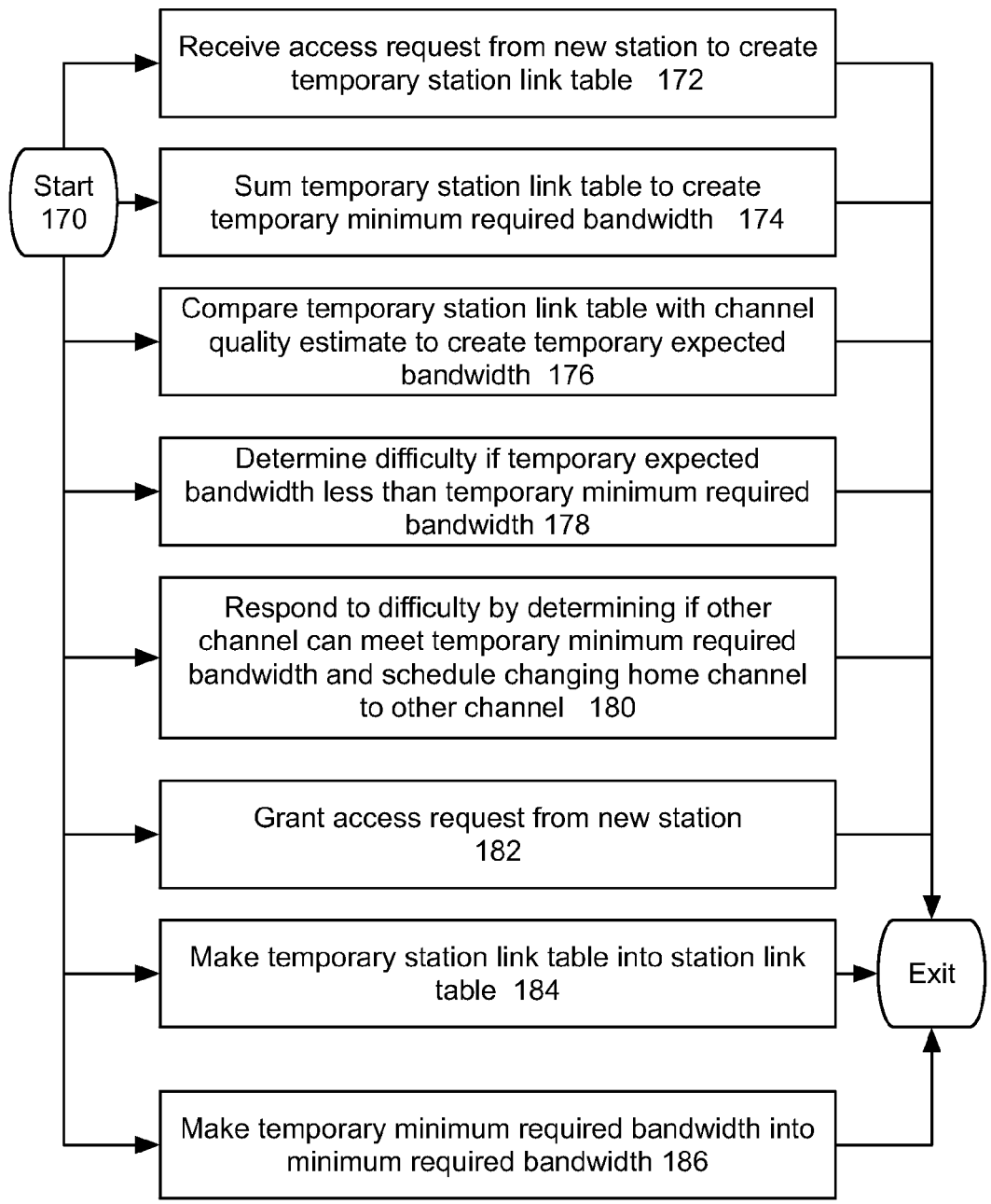

FIG. 14 shows a simplified flowchart of some details of program step 170 responding to a request by a new station 6 to join the wireless network serviced by the access point. Program step 172 supports receiving a request from a new station 6 to create a temporary station link table 38. Program step 174 supports summing the temporary station link table to create a temporary minimum required bandwidth 46. Program step 176 supports comparing the temporary station link table with the channel quality estimate 30 to create a temporary expected bandwidth. Program step 178 supports determining if the access point 2 has difficulty if the temporary expected bandwidth is less than the temporary minimum required bandwidth 46. Program step 180 supports responding to the difficulty by determining if the other channel 36 can meet the temporary minimum required bandwidth and scheduling changing the home channel 34 to the other channel 36. Program step 182 supports granting access to the new station 6. Program step 184 supports making the temporary station link table into the station link table 38. Program step 186 supports making the temporary minimum required bandwidth into the minimum required bandwidth 46.

The preceding embodiments provide examples and are not meant to constrain the scope of the following claims.

What is claimed is:
1. A method of operating an access point for wireless communication comprising:
   (1) wirelessly communicating in a first band comprising a first plurality of channels, including a first home channel and a first other channel, the first band having a first frequency about which the first plurality of channels are arranged;
   (2) sampling energy present in the first band, and in response, estimating a channel quality of the first home channel and a channel quality of the first other channel;
   (3) using the estimated channel quality of the first home channel to determine an expected bandwidth of the first home channel;
   (4) using the estimated channel quality of the first other channel to determine an expected bandwidth of the first other channel;
   (5) determining a minimum required bandwidth for one or more links established by the access point on the first home channel; and
   (6) determining that the minimum required bandwidth is greater than the expected bandwidth of the first home channel, but less than the expected bandwidth of the first other channel, and in response, switching the one or more links established on the first home channel to the first other channel; wherein step (2) comprises:
   periodically sampling energy of the first home channel, thereby creating a plurality of first home channel energy samples;
   comparing each of the plurality of first home channel energy samples to a threshold; and
   determining a first percentage of the first home channel energy samples that are less than the threshold.

2. The method of claim 1, wherein step (2) comprises:
periodically sampling energy present in the first band using a first method if the first frequency has a first value; and
periodically sampling energy present in the first band using a second method, different than the first method, if the first frequency has a second value, different than the first value.

3. The method of claim 1, wherein step (2) further comprises using the first percentage to specify the estimated channel quality of the first home channel.

4. The method of claim 1, wherein step (2) further comprises:
periodically sampling energy of the first other channel, thereby creating a plurality of first other channel energy samples;
comparing each of the plurality of first other channel energy samples to the threshold; and
determining a second percentage of the first other channel energy samples that are less than the threshold.

5. The method of claim 4, wherein step (2) further comprises:
using the first percentage to specify the estimated channel quality of the first home channel; and
using the second percentage to specify the estimated channel quality of the first other channel.

6. The method of claim 1, wherein step (2) further comprises suspending transmissions in the first band while periodically sampling.

7. The method of claim 1, wherein step (5) comprises:
determining a specific amount of bandwidth required by a transaction on the one or more links; and
including the specific amount of bandwidth required by the transaction in the minimum required bandwidth.

8. The method of claim 1, further comprising:
(7) wirelessly communicating in a second band comprising a second plurality of channels, including a second home channel and a second other channel, the second band having a second frequency about which the second plurality of channels are arranged;
(8) sampling energy present in the second band, and in response, estimating a channel quality of the second home channel and a channel quality of the second other channel;
(9) using the estimated channel quality of the second home channel to determine an expected bandwidth of the second home channel;
(10) using the estimated channel quality of the second other channel to determine an expected bandwidth of the second other channel;
(11) determining a second minimum required bandwidth for one or more links established by the access point on the second home channel; and
(12) determining that the second minimum required bandwidth is greater than the expected bandwidth of the second home channel, but less than the expected bandwidth of the second other channel, and in response, switching the one or more links established on the second home channel to the second other channel.

9. A method of operating an access point for wireless communication comprising:
(1) wirelessly communicating in a first band comprising a first plurality of channels, including a first home channel and a first other channel, the first band having a first frequency about which the first plurality of channels are arranged;
(2) sampling energy present in the first band, and in response, estimating a channel quality of the first home channel and a channel quality of the first other channel;
(3) using the estimated channel quality of the first home channel to determine an expected bandwidth of the first home channel;
(4) using the estimated channel quality of the first other channel to determine an expected bandwidth of the first other channel;
(5) determining a minimum required bandwidth for one or more links established by the access point on the first home channel; and
(6) determining that the minimum required bandwidth is greater than the expected bandwidth of the first home channel, but less than the expected bandwidth of the first other channel, and in response, switching the one or more links established on the first home channel to the first other channel; wherein step (2) comprises:
wirelessly transmitting a beacon signal that orders a contention free period in the first band;
sampling energy in the first band during the contention free period; and
wirelessly transmitting a signal that ends the contention free period in the first band.

10. The method of claim 9, wherein the first frequency is 2.4 GHz.

11. A method of operating an access point for wireless communication comprising:
(1) wirelessly communicating in a first band comprising a first plurality of channels, including a first home channel and a first other channel, the first band having a first frequency about which the first plurality of channels are arranged;
(2) sampling energy present in the first band, and in response, estimating a channel quality of the first home channel and a channel quality of the first other channel;
(3) using the estimated channel quality of the first home channel to determine an expected bandwidth of the first home channel;
(4) using the estimated channel quality of the first other channel to determine an expected bandwidth of the first other channel;
(5) determining a minimum required bandwidth for one or more links established by the access point on the first home channel; and
(6) determining that the minimum required bandwidth is greater than the expected bandwidth of the first home channel, but less than the expected bandwidth of the first other channel, and in response, switching the one or more links established on the first home channel to the first other channel; wherein step (2) comprises:
wirelessly transmitting a beacon that orders silence in the first band for performing a radar search;
sampling energy in the first band during the silence in the first band; and
wirelessly transmitting a signal that ends the silence in the first band.

12. The method of claim 11, wherein the first frequency is 5 GHz.

13. A method of operating an access point for wireless communication comprising:
(1) wirelessly communicating in a first band comprising a first plurality of channels, including a first home channel and a first other channel, the first band having a first frequency about which the first plurality of channels are arranged;

(2) sampling energy present in the first band, and in response, estimating a channel quality of the first home channel and a channel quality of the first other channel;

(3) using the estimated channel quality of the first home channel to determine an expected bandwidth of the first home channel;

(4) using the estimated channel quality of the first other channel to determine an expected bandwidth of the first other channel;

(5) determining a minimum required bandwidth for one or more links established by the access point on the first home channel; and (6) determining that the minimum required bandwidth is greater than the expected bandwidth of the first home channel, but less than the expected bandwidth of the first other channel, and in response, switching the one or more links established on the first home channel to the first other channel; wherein step (5) comprises:

determining a first minimum required bandwidth of a first link established on the first home channel;

determining a second minimum required bandwidth of a second link established on the first home channel; and adding the first minimum required bandwidth and the second minimum required bandwidth to determine the minimum required bandwidth.

14. A device for wireless communication comprising:
a first transceiver that wirelessly communicates in a first band comprising a first plurality of channels, including a first home channel and a first other channel, the first band having a first frequency about which the first plurality of channels are arranged;
a processor that controls the first transceiver to sample energy present in the first band, and in response, estimates a channel quality of the first home channel and a channel quality of the first other channel, wherein the processor is configured to: use the estimated channel quality of the first home channel to determine an expected bandwidth of the first home channel, use the estimated channel quality of the first other channel to determine an expected bandwidth of the first other channel, determine a minimum required bandwidth for one or more links established by the device on the first home channel, and determine that the minimum required bandwidth is greater than the expected bandwidth of the first home channel, but less than the expected bandwidth of the first other channel, and in response, switch the one or more links established on the first home channel to the first other channel, wherein the processor comprises:
means for instructing the first transceiver to periodically sample energy of the first home channel, thereby creating a plurality of first home channel energy samples;
means for comparing each of the plurality of first home channel energy samples to a threshold; and
means for determining a first percentage of the first home channel energy samples that are less than the threshold.

15. The device of claim 14, further comprising a station link table maintained by the processor, wherein the station link table stores an entry for each of the one or more links established by the device on the first home channel, each entry identifying a determined bandwidth of the corresponding link.

16. The device of claim 15, wherein the processor includes means for summing the determined bandwidth of each of the one or more links established by the device on the first home channel to determine the minimum required bandwidth.

17. The device of claim 14, wherein the processor further comprises means for using the first percentage to specify the estimated channel quality of the first home channel.

18. The device of claim 14,
wherein the processor further comprises:
means for instructing the first transceiver to periodically sample energy of the first other channel, thereby creating a plurality of first other channel energy samples;
means for comparing each of the plurality of first other channel energy samples to the threshold; and
means for determining a second percentage of the first other channel energy samples that are less than the threshold.

19. The device of claim 18, wherein the processor further comprises:
means for using the first percentage to specify the estimated channel quality of the first home channel; and
means for using the second percentage to specify the estimated channel quality of the first other channel.

20. The device of claim 14, further comprising:
a second transceiver that wirelessly communicates in a second band comprising a second plurality of channels, including a second home channel and a second other channel, the second band having a second frequency about which the second plurality of channels are arranged;
wherein the processor controls the second transceiver to sample energy present in the second band, and in response, estimate a channel quality of the second home channel and a channel quality of the second other channel, wherein the processor is further configured to: use the estimated channel quality of the second home channel to determine an expected bandwidth of the second home channel, use the estimated channel quality of the second other channel to determine an expected bandwidth of the second other channel, determine a second minimum required bandwidth for one or more links established by the device on the second home channel, and determine that the second minimum required bandwidth is greater than the expected bandwidth of the second home channel, but less than the expected bandwidth of the second other channel, and in response, switch the one or more links established on the second home channel to the second other channel.

21. A device for wireless communication comprising:
a first transceiver that wirelessly communicates in a first band comprising a first plurality of channels, including a first home channel and a first other channel, the first band having a first frequency about which the first plurality of channels are arranged;
a processor that controls the first transceiver to sample energy present in the first band, and in response, estimates a channel quality of the first home channel and a channel quality of the first other channel, wherein the processor is configured to: use the estimated channel quality of the first home channel to determine an expected bandwidth of the first home channel, use the estimated channel quality of the first other channel to determine an expected bandwidth of the first other channel, determine a minimum required bandwidth for one or more links established by the device on the first home channel, and determine that the minimum required bandwidth is greater than the expected bandwidth of the first home channel, but less than the expected bandwidth of the first other channel, and in response, switch the one or more links established on the first home channel to the first other channel, wherein the processor comprises means for causing the first transceiver to transmit a beacon that suspends transmissions in the first band.

22. The device of claim 21, wherein the beacon orders a contention free period in the first band.

23. The device of claim 22, wherein the first frequency is 2.4 GHz.

24. The device of claim 21, wherein the beacon orders silence in the first band for performing a radar search.

25. The device of claim 24, wherein the first frequency is 5 GHz.

* * * * *